United States Patent Office 3,524,829
Patented Aug. 18, 1970

3,524,829
REDOX CATALYST AND CATALYTIC METHOD OF POLYMERIZING MONOMERS COMPRISING VINYL CHLORIDE
Claude Lambling, Boulogne, and Jean-Claude Percheron, Chedde, France, assignors to Produits Chimiques Pechiney Saint-Gobain, Paris, France
No Drawing. Filed Dec. 14, 1967, Ser. No. 690,397
Claims priority, application France, Dec. 22, 1966, 88,502
Int. Cl. B01j *11/82*
U.S. Cl. 260—23       5 Claims

ABSTRACT OF THE DISCLOSURE

Redox type systems for the polymerization of monomers comprising vinyl chloride, preferably in aqueous suspension, containing a typical organic peroxy compound and the titanium salt of a saturated fatty acid in which the titanium is of valence III (titanous).

---

This invention relates to the preparation of polymers, a term which includes copolymers, of vinyl chloride in aqueous suspension and to a novel catalyst system for the polymerization. It is known to polymerize vinyl monomers, of which vinyl chloride is an outstanding example, using redox catalyst systems as initiators. The redox systems contain an organic peroxide and ferrous soap, the soap accelerating the decomposition of the organic peroxide and the formation of free radicals. Redox systems introduce undesirable coloration, a coloration which cannot readily or satisfactorily be removed.

It is an object of this invention to prepare polymers and copolymers of vinyl chloride and its compatible comonomers in a state which is essentially white. A particular object is to prepare such polymers with efficiency in aqueous suspension. The use of the novel catalyst may be extended, also, to polymerizations in mass, with appropriate procedural modifications.

Polymerization in suspension is accomplished by suspending the monomeric composition in an aqueous medium into which the catalyst is also introduced. Polymerization in mass is the polymerization of vinyl chloride in liquid state in the absence of contaminates other than the trace of catalyst.

The objects of the invention are accomplished generally speaking by a method of polymerizing in suspension a monomeric composition comprising vinyl chloride which comprises, under conditions of temperature and pressure favorable to polymerization, mixing vinyl chloride with a redox type catalyst having as essential constituents an organic peroxy compound and an unstable titanium salt of a saturated fatty acid.

According to the invention the redox system which is introduced into the suspension of the monomeric composition includes an unstable titanium compound of the formula: $Ti(C_nH_{2n+1}COO)_3$, in which $n$ is a whole number from 1 to 22 inclusive, preferably from 6 to 18 inclusive.

This novel catalyst system does not introduce objectionable color to the polymers and copolymers, a fact which may arise from the fact that the titanium is in the degree of oxidation III (titanous) which undergoes oxidation during polymerization to compositions of oxidation IV (titanic) which are white. This novel catalyst system has the further advantage of being able to continue oxidizing in air if the salts of titanium are not completely oxidized at the end of the polymerization.

The new catalyst systems initiate polymerization of vinyl chloride with or without its compatible comonomers at temperatures from −15° C. to 70° C., although a preferred temperature range is from 20° C. to 60° C., a range which is particularly advantageous because within it the usual initiators, such as benzoyl peroxide, have had little effect.

The comonomers which are compatible with vinyl chloride are numerous and lists of them have been prepared and published elsewhere, including e.g. the olefins, and all of such comonomers are capable of being copolymerized according to this invention. A particularly valuable product is made by the copolymerization of vinyl chloride and propylene in suspension according to this invention.

Among the organic peroxy compounds which have been used as initiators under the conditions of prior art practice, in redox systems, are such as lauroyl peroxide, benzoyl peroxide, isopropyl peroxydicarbonate, and 2-ethyl-hexyl peroxydicarbonate, which are exemplary of a class of organic peroxide initiators, lists of which have been published elsewhere. They find increased effectiveness in combination with the novel titanium compounds, being favorably used, in more advantageous temperature ranges.

At a given temperature, speed and kinetic of the polymerization are regulated by the total concentration of the redox system in the suspension and by the ratio of the titanium salt to the organic peroxy composition.

The inventors have observed that the polymerization proceeds very favorably at 35° C. when the ratio of titanium salt to peroxide is 1:1 and when it is from 0.1 to 2% by weight of the organic peroxy compound based on the monomer present. At a given temperature the mean hourly yield of the polymerization in suspension by this invention is a waxing function of the number of carbon atoms in the titanium salt.

The titanium salts as defined above can be prepared by known methods for instance from the corresponding sodium salt; they can also be prepared in situ before the polymerization or continuously as the polymerization proceeds. During the preparation of these titanium salts oxygen should be excluded.

The new products have good thermal stability.

The following examples illustrate the invention without detracting from the generality of what is elsewhere herein stated:

EXAMPLE 1

A glass autoclave having a capacity of 1 l., provided with a helical agitator, received 155 g. of aqueous sodium soap which had been prepared from 2.067 g. of caproic acid and 0.713 g. of soda. 350 g. of water, free of oxygen, were added to the solution. Additional soda was then added until there existed an excess of 10% beyond what was theoretically necessary for saponification of the caproic acid.

Under a current of argon, to exclude all oxygen, 6 g. of an acid solution of titanium chloride of 15% concentration, 2.3 g. of lauroyl peroxide, and 0.35 g. of polyvinyl alcohol were added successively. Then 230 g. of vinyl chloride were introduced. Polymerization was carried out at 35° C. with continuous agitation at 750 r.p.m. Polymerization stopped after 3½ hours. The polymer obtained was washed and dried; the yield was 102 g. of polyvinyl chloride, perfectly white, representing an hourly average yield of 12.7%. The polymer had good thermal stability and an index of viscosity (AFNOR No. (NF) T–51–103) of 161.

EXAMPLE 2

Into the autoclave of Example 1 were introduced 375 g. of an aqueous solution of sodium soap prepared from 4.98 g. of palmitic acid and 0.78 g. of soda. 130 g. of oxygen-free water were introduced. The charging of the autoclave continued as in Example 1 with identical quantities of reactants and under identical conditions of operation. Polymerization was terminated after 225 minutes and the product was washed, drained and dried. It was 150 g. of polyvinyl chloride, perfectly white, with an index of viscosity of 111, at an hourly average yield of 17.4%.

EXAMPLE 3

A glass autoclave of 1 l. capacity, identical with that used in Example 1, received 375 g. of aqueous sodium soap prepared from 4.922 g. of stearic acid and 0.692 g. of soda. 130 g. of oxygen-free water were added. The charging of the autoclave was completed as in Example 1 and the conditions of reaction were duplicated. Polymerization was ended after 155 minutes. The product was similarly washed and dried and the yield was 120 g. of perfectly white polyvinyl chloride of index of viscosity 120, and a mean hourly yield of 21%.

EXAMPLE 4

A stainless steel autoclave of 5 l. capacity provided with a helical agitator received 1430 g. of an aqueous solution of sodium laurate, corresponding to the saponification of 19.066 g. of lauric acid by 3.81 g. of soda. The autoclave was purged of air by argon and the temperature of the solution was raised to 35° C. At this temperature there were introduced 6.3 g. of soda, 33.87 g. of a 15% aqueous acid solution of titanium trichloride, 62.38 g. of a 42% solution of polyvinyl alcohol, and 13.12 g. of lauroyl peroxide. The charging of the autoclave was completed by introducing 1750 g. of vinyl chloride. An addition of oxygen-free water completed the loading of the autoclave. Polymerization continued at 35° C., the agitator rotating at 365 r.p.m., for 6 hours after which the product was washed, drained and dried. The yield was 860 g. of perfectly white polyvinyl chloride corresponding to an hourly yield of 8.19%. The polymer had good thermal stability and an index of viscosity of 191.

EXAMPLE 5

The autoclave of Example 4 received 2127 g. of an aqueous solution of sodium stearate, corresponding to the saponification of 28.36 g. of stearic acid by 3.99 g. of soda. The autoclave was charged as in Example 4 and polymerization was carried out at 35° C. for 4 hours. The product was isolated as in Example 4, was perfectly white, weighed 1540 g., corresponding to an hourly yield of 22%. The polymer had good thermal stability and an index of viscosity of 176.

EXAMPLE 6

The autoclave of Example 4 received 2400 g. of an aqueous solution of sodium stearate, corresponding to the saponification of 19.453 g. of stearic acid by 2.735 g. of soda. Argon purged the air from the autoclave and remained during the polymerization. The temperature was raised to 35° C. and under a current of argon 4.32 g. of soda, 23.20 g. of a 15% aqueous solution of titanium trichloride, 42.77 g. of a 4.2% aqueous solution of polyvinyl alcohol, and 9 g. of lauroyl peroxide were added. 500 g. of vinyl chloride and 200 g. of propylene were added successively and a final charge of 500 g. of vinyl chloride were introduced. Polymerization continued at 35° C. and 365 r.p.m. for 4 hours 45 minutes after which the product was isolated as in Example 4. The yield was 220 g. of perfectly white copolymer corresponding to an hourly yield of 3.9%. The copolymer contained 5.8% of propylene in the chains and possessed a thermal stability comparable to that of the homopolymer. Its mechanical properties were good, its index of viscosity was 66, and its index of fluidity at high temperature was very high.

As the fatty acid salts of titanium III are unstable, the catalyst initiator is prepared either in situ just before the polymerization or progressively to the extent necessary while polymerization is proceeding. In making them it is advisable to include a moderate excess of soda, the presence of which facilitates the reaction of preparation. Various suspension agents may be used and numbers of them have been described in the literature and need not be listed here; among them polyvinyl alcohol is particularly hydrophilic and serves well. Copolymerizations with other ethylenic comonomers can be successfully initiated by this catalyst initiator, notably ethylene. The use of soda in preparing the titanium salt is not exclusive. One may employ any of the hydroxides of alkali metals, for instance potassium hydroxide or lithium hydroxide, but it is to be noted that, while the reaction proceeds, the presence of potassium is undesirable in containers which are to be used to hold food. There is ordinarily no reason to depart from the use of soda.

An advantage of this invention is a redox catalyst and a polymerization process employing it, which produced perfectly white polymers, both homopolymers and copolymers. Another advantage of the invention is in novel polymers containing traces of a titanium salt of a fatty acid and of novel products possessed of residual powers of oxidation.

As many apparently widely different embodiments of the present invention may be made without departing from the spirit and scope thereof, it is to be understood that the invention is not limited to the specific embodiments.

What is claimed is:

1. A redox catalyst for the polymerization of monomeric compositions containing vinyl chloride, consisting in its essential elements of an organic peroxy compound of the group consisting of peresters and diacylperoxides and of a titanous salt and having the formula $$Ti(C_nH_{2n+1}COO)_3$$

in which $n$ is from 6 to 18 inclusive.

2. A method of polymerizing in aqueous suspension a monomeric composition comprising vinyl chloride which comprises, mixing the monomer with a redox catalyst formed in situ under inert atmosphere by two components in equimolecular ratio, the first component being an organic peroxy compound of the group consisting of peresters and diacyl peroxides, the second being a titanous salt having the formula $(C_nH_{2n+1}COO)_3$ in which $n$ is from 6 to 18 inclusive, the redox catalyst being used in proportions corresponding to 0.1 to 2% of organic peroxy compound by weight of monomer, and polymerizing the monomer at a temperature from about −15° C. to 70° C.

3. The method of claim 2 in which the polymerization is between 20 and 60° C.

4. The method of claim 2 in which the monomeric composition contains vinyl chloride alone.

5. The method of claim 2 in which the monomeric composition contains vinyl chloride and propylene.

References Cited

UNITED STATES PATENTS 3,341,506  9/1967  Wang _____ 260—92.8 X
3,373,150  3/1968  Pears et al. _____ 260—92.8

DONALD E. CZAJA, Primary Examiner

D. J. BARRACK, Assistant Examiner

U.S. Cl. X.R.

252—431; 260—87.5, 92.8